Jan. 4, 1927.  1,613,027
S. I. FEKETE ET AL
LUBRICATING SYSTEM FOR DISTRIBUTOR DRIVE UNITS
Filed August 4, 1923
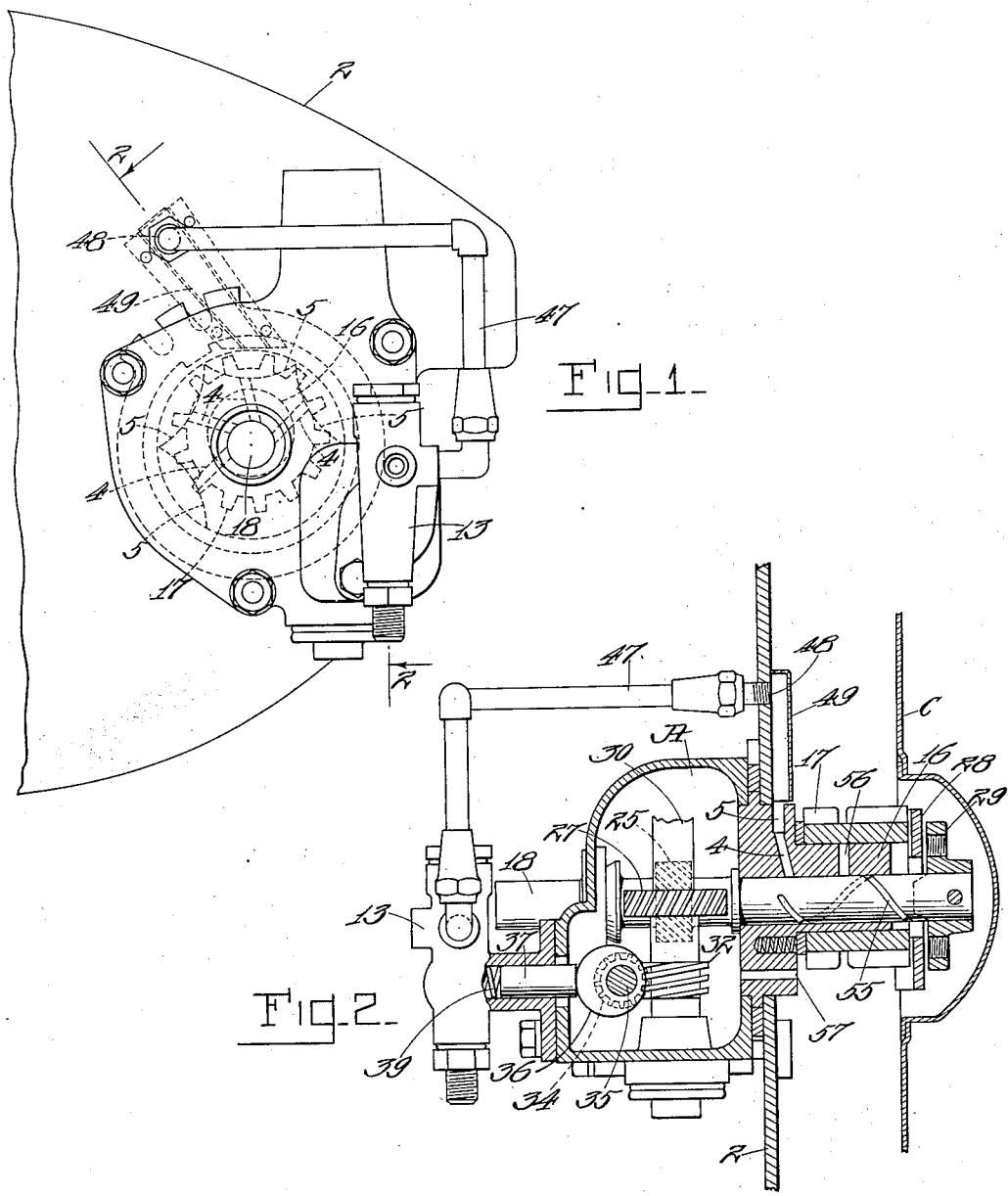

Patented Jan. 4, 1927.

1,613,027

UNITED STATES PATENT OFFICE.

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

LUBRICATING SYSTEM FOR DISTRIBUTOR-DRIVE UNITS.

Application filed August 4, 1923. Serial No. 655,759.

In Letters Patent No. 1,553,225, dated September 8, 1925, we have shown a unit for the drive of a distributor and other parts of an internal combustion engine. This unit includes an eccentric bearing for the adjustment of a timing chain sprocket and an Oldham joint for connecting the lubricator drive shaft with the timing chain sprocket, also the distributor shaft and oil pump. The present invention has for its object a lubricating system by which the bearing surfaces of the several parts shown in said application may be kept fully lubricated at all times. It will be understood, of course, by those skilled in the art that the timing chain places considerable pressure on the bearing surfaces of the timing chain sprocket, also that the several revolving parts are driven at high speeds.

The lubricating system embodying the present invention provides means by which a continuous flow of oil is supplied to all the bearing surfaces automatically, there being no adjustment nor attention required of the operator of the vehicle. The lubricating system comprising the present invention is combined with the lubricating system of the engine as a whole; that is, the oil pump forming part of the unit shown in the drawings takes oil from the sump of the engine, drives oil through the unit and delivers it to the engine oiling system whence it passes in the well known manner to the crank shaft bearings, cylinder walls and wrist pin bearings.

The invention will be fully understood from the following description when taken in connection with the accompanying drawings, and the novel features thereof will be pointed out and clearly defined in the claims at the close of this specification.

In the drawings:

Fig. 1 is a rear elevation of the parts embodying the present invention.

Fig. 2 is a section taken substantially on the line 2—2, Fig. 1.

Referring now to the drawings:

At 2 is shown one of the front motor legs, at 16 the eccentric bushing, at 17 the timing chain sprocket revolving on the eccentric bushing and connected to the generator shaft 18 by a cross member 28 and cap 29, which together form the Oldham joint. This Oldham joint permits the timing chain (not shown) to be tightened by revolving the eccentric bushing 16. The generator shaft 18 carries a spiral gear 25 meshing with the spiral gear 27 on a vertical distributor shaft 30. The distributor shaft also carries a spiral bevel 32 meshing with a spiral gear 34 on a horizontal pump shaft 35. The pump shaft carries an eccentric 36 which operates the plunger 37 of the oil pump 13 in one direction. It is operated in the other direction by a spring 39.

Lubrication for the generator drive shaft 18 and for the eccentric bearing 16 on which the sprocket 17 runs is obtained by the following means. The front cover C of the motor forms an oil tight chamber to which the oil is delivered by the oil pump through the lead 47 entering through a port 48 which is covered by a baffle plate 49 which directs the oil downward into one of several oil holes 4 in the eccentric bearing 16, several of the these holes being provided so that in whatever position of adjustment the bearing may be, one of the holes 4 will be in substantially vertical position to receive the oil. The holes 4 are drilled on an angle as shown so that the generator shaft will tend to carry the oil away from the orifice into the bearing. This portion of the bearing is to cut out as shown at 5 to guide the oil into the hole. The generator shaft 18 is spirally grooved as shown at 55. The bearing is also provided with one or more radial oil holes 56. The oil which enters through whichever oil hole 4 is uppermost passes downward and is carried along the spiral oil groove 55 and then flows upward through hole 56 attempting to seek its own level on account of the head in the hole 4, the upper end of which is higher than the upper end of the radial hole 56. The oil which rises in the hole 56 is carried through the bearing by the rapidly revolving sprocket 17, so that there is a constant flow of oil on both the inner and outer bearing surfaces of the eccentric bearing 16.

A portion of the oil is carried along by the spiral grooves 55 until it reaches the cross bar 28 and cap 29. It is then thrown upwardly by centrifugal force and lubricates the bearing surfaces of the parts forming the Oldham joint. All of the oil is discharged into the spaces contained within the front casing C from which it finds its way into the engine oiling system through passages not shown.

Another portion of the oil passes to the left along the generator shaft 18 into the chamber A adjacent the oil pump. Oil from the oil pump also leaks past the plunger 37 and fills the chamber A up to the level of the oil port 57 through which it overflows into the front chamber from whence it flows into the lubricating system of the engine.

The oil level in the chamber A which is determined by the location of the oil port 57 is at about the center of the oil pump shaft 35 so that the bottom of the worm 32 dips in the oil and carries it upward lubricating the worm 32 and gear 34. The rapid rotation of the parts and the capillary attraction carries sufficient oil up the distributor shaft 30 to keep the spiral gears 25 and 27 sufficiently lubricated.

In this way all of the moving parts are kept constantly lubricated by a constantly moving flow of oil as it passes from the oil pump to the engine lubricating system. The system is simple and automatic in operation and requires no attention whatever on the part of the operator.

What we claim is:

1. The unit comprising a casing, an oil pump, an angularly adjustable eccentric bearing, a sprocket on the bearing, a generator shaft extending through the bearing, an Oldham joint connecting the shaft and sprocket, said bearing having an entrance oil hole at one side of said sprocket leading to said shaft and an exit oil hole leading from the shaft to the sprocket, and means for discharging oil delivered by said pump upon said bearing beside said sprocket and into a position to enter said entrance oil hole.

2. The unit comprising a casing, an oil pump, an angularly adjustable eccentric bearing, a sprocket on the bearing, a generator shaft extending through the bearing, an Oldham joint connecting the shaft and sprocket, said bearing having an entrance oil hole at one side of said sprocket leading to said shaft, a guide surface leading to said hole, and an exit oil hole leading from the shaft to the sprocket, and means for discharging oil delivered by said pump upon said bearing beside said sprocket and into a position to enter said entrance oil hole.

3. The unit comprising a casing, an oil pump, an angularly adjustable eccentric bearing, a sprocket on the bearing, a generator shaft extending through the bearing, an Oldham joint connecting the shaft and sprocket, said bearing having a plurality of angularly spaced oil holes at one side of said sprocket leading to said shaft and an exit oil hole leading from the shaft to the sprocket, and means for discharging oil delivered by said pump upon said bearing beside said sprocket and into a position to enter one or more of said entrance oil holes.

4. The unit comprising a casing, an eccentric bearing having a bore, an entrance oil hole leading to the bore, and an exit oil hole leading away from the bore, a sprocket revolving on the bearing, a generator shaft in the bore of the bearing, said shaft having a spiral oil groove in its surface, and Oldham coupling connecting the shaft and the sprocket, and means to deliver oil in position to flow into the entrance holes in the bearing.

5. The unit comprising a casing, an oil pump, an eccentric bearing, a sprocket on said eccentric bearing, a generator shaft in said bearing, a vertical distributor shaft geared to the generator shaft, an oil pump shaft geared to the distributor shaft, an oil pump operated by said pump shaft and having a plunger bore opening into a chamber in the casing, a plunger in the said bore, an oil port leading out of the chamber and determining the oil level therein, said oil port being located to keep the oil level above the lowest gear on the distributor shaft, the parts being constructed and arranged so that leakage past the pump plunger will fill the chamber to the level of the oil port and the surplus will discharge through the port into the lubricating system of the engine.

In testimony whereof we affix our signatures.

STEPHEN I. FEKETE.
STUART G. BAITS.